(12) United States Patent
Sekii

(10) Patent No.: US 10,495,886 B2
(45) Date of Patent: Dec. 3, 2019

(54) ROTARY DRIVE APPARATUS

(71) Applicant: Nidec Corporation, Kyoto (JP)

(72) Inventor: Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 133 days.

(21) Appl. No.: 15/726,487

(22) Filed: Oct. 6, 2017

(65) Prior Publication Data

US 2018/0239153 A1 Aug. 23, 2018

(30) Foreign Application Priority Data

Feb. 23, 2017 (JP) ................................. 2017-031676

(51) Int. Cl.
| | |
|---|---|
| *H02K 7/02* | (2006.01) |
| *G02B 27/01* | (2006.01) |
| *G02B 26/10* | (2006.01) |

(52) U.S. Cl.
CPC ....... *G02B 27/0179* (2013.01); *G02B 26/103* (2013.01); *G02B 27/017* (2013.01); *G02B 2027/0187* (2013.01); *Y02E 60/16* (2013.01)

(58) Field of Classification Search
CPC ...... H02K 35/02; H02K 7/1853; H02K 35/00; H02K 7/02; H02K 23/04; H02K 7/1807; H02K 11/33; H02K 5/00; H02K 7/04; B60B 33/001; B60B 33/0021; B60B 33/0028; B60B 33/0039; B60B 33/0049; B60B 33/0057; B60B 33/0068; B60B 33/0073; B60B 33/028
See application file for complete search history.

(56) References Cited

U.S. PATENT DOCUMENTS

| | | | | |
|---|---|---|---|---|
| 5,402,258 A | * | 3/1995 | Murakami | ........... G02B 7/1821 347/258 |
| 6,388,981 B1 | * | 5/2002 | Sohn | ...................... F16F 15/363 360/99.08 |
| 6,580,186 B1 | * | 6/2003 | Suzuki | ................... F16C 17/026 310/51 |
| 6,815,852 B2 | * | 11/2004 | Horng | ...................... H02K 7/14 310/51 |

FOREIGN PATENT DOCUMENTS

JP 2000-207823 A 7/2000

* cited by examiner

*Primary Examiner* — Duc Q Dinh
(74) *Attorney, Agent, or Firm* — Keating & Bennett, LLP

(57) ABSTRACT

This rotary drive apparatus is arranged to rotate a flywheel arranged to support an optical component arranged to reflect incoming light coming from a light source or allow reflected light obtained by reflection of the incoming light to pass therethrough, and includes a motor including a rotating portion, and the flywheel, the flywheel being supported by the motor and arranged to rotate about a central axis extending in a vertical direction. The flywheel includes at least one recessed portion recessed axially downward from an upper surface of the flywheel. The flywheel further includes at least one weight arranged in the at least one recessed portion.

16 Claims, 8 Drawing Sheets

ROTARY DRIVE APPARATUS

CROSS REFERENCE TO RELATED APPLICATIONS

This application claims the benefit of priority to Japanese Patent Application No. 2017-031676 filed on Feb. 23, 2017. The entire contents of this application are hereby incorporated herein by reference.

BACKGROUND OF THE INVENTION

1. Field of the Invention

The present invention relates to a rotary drive apparatus.

2. Description of the Related Art

A known scanner apparatus used for position recognition in a head-mounted display (HMD) or the like typically has installed therein an optical component, such as, for example, a mirror arranged to reflect incoming light coming from a light source, a light guide member arranged to guide the incoming light and reflected light, and a motor arranged to rotate the scanner apparatus. A known motor is described in, for example, JP-A 2000-207823. The motor described in JP-A 2000-207823 includes a hole defined in a rotating member of the motor, and a weight can be fitted in the hole for balance correction. Thus, high rotational accuracy can be secured.

However, in the motor described in JP-A 2000-207823, the hole is defined in an upper portion of the rotating member of the motor. Therefore, when the motor is used in a rotary drive apparatus with a flywheel that supports an optical component, such as, for example, a mirror, installed on the upper portion of the rotating member of the motor, it is difficult to adjust balance of the rotating member after the flywheel is attached to the upper portion of the rotating member.

SUMMARY OF THE INVENTION

A rotary drive apparatus according to a preferred embodiment of the present invention is arranged to rotate a flywheel arranged to support an optical component arranged to reflect incoming light coming from a light source or allow reflected light obtained by reflection of the incoming light to pass therethrough, and includes a motor including a rotating portion, and the flywheel, the flywheel being supported by the motor and arranged to rotate about a central axis extending in a vertical direction. The flywheel includes at least one recessed portion recessed axially downward from an upper surface of the flywheel. The flywheel further includes at least one weight arranged in the at least one recessed portion.

According to the above preferred embodiment of the present invention, the flywheel includes at least one recessed portion recessed axially downward from the upper surface thereof, and further includes at least one weight arranged in the at least one recessed portion. Accordingly, in the rotary drive apparatus, in which the flywheel arranged to support the optical component, such as, for example, a mirror, may be installed on an upper portion of the motor, it is possible to correct balance during rotation after the flywheel is attached to the upper portion of the motor without the need to remove the flywheel, to stabilize rotation of the motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor, which will be described below, is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a light source is arranged with respect to the motor is defined as an upper side. The shape of each member or portion and relative positions of different members or portions will be described based on the above assumptions. It should be noted, however, that the above definitions of the vertical direction and the upper side are not meant to restrict in any way the orientation of a rotary drive apparatus according to any preferred embodiment of the present invention when in use. Also note that the term "parallel" as used herein includes both "parallel" and "substantially parallel". Also note that the term "perpendicular" as used herein includes both "perpendicular" and "substantially perpendicular".

1. First Preferred Embodiment 1-1. Structure of Rotary Drive Apparatus

Figure 1:
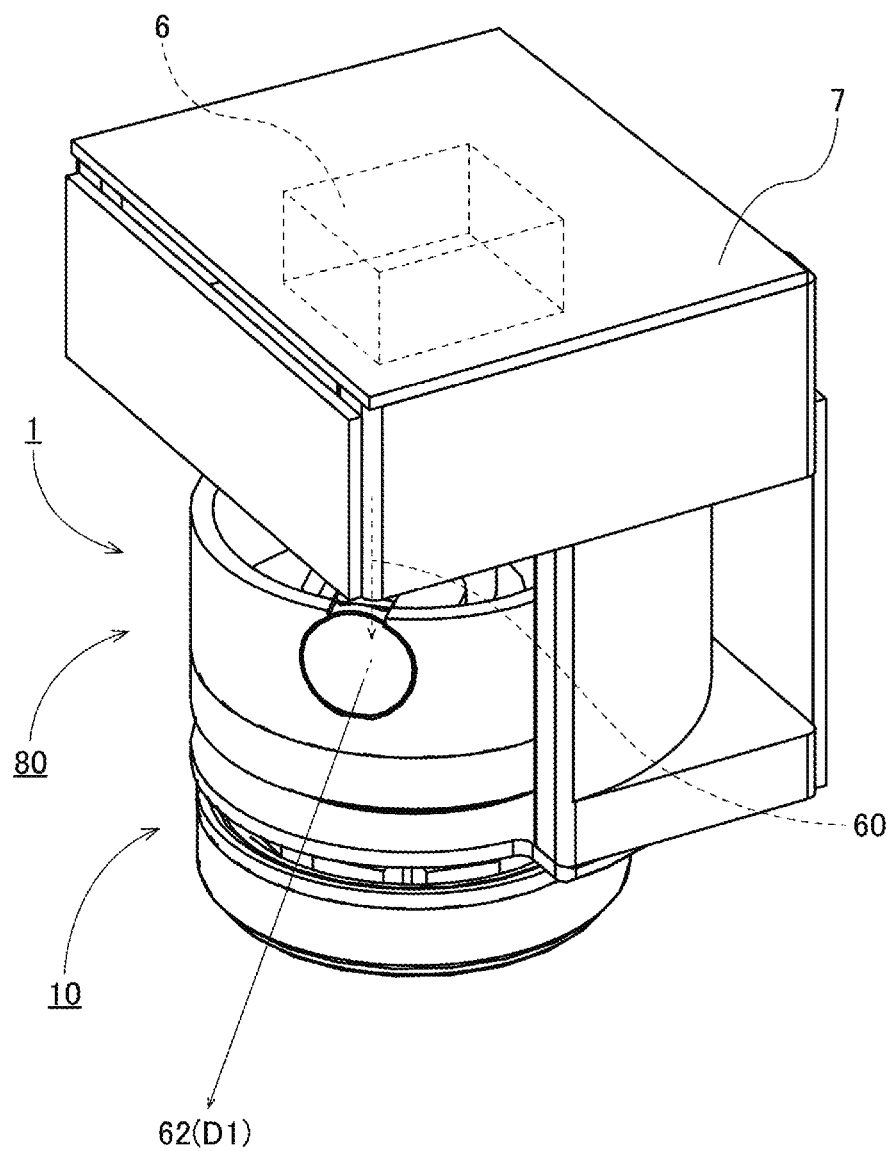
FIG. 1 is a perspective view of a light source, a frame, and a rotary drive apparatus according to a first preferred embodiment of the present invention.

FIG. 1 is a perspective view of a light source 6, a frame 7, and a rotary drive apparatus 1 according to a first preferred embodiment of the present invention. The rotary drive apparatus 1 is an apparatus arranged to rotate a flywheel 80 arranged to support a mirror 61, which is arranged to reflect incoming light 60 coming from the light source 6 in a radial direction (i.e., a first radial direction D1) and which will be described below, and a lens 63, which will be described below, and emit reflected light 62 obtained by the mirror 61 reflecting the incoming light 60 to an outside of the rotary drive apparatus 1 through the lens 63 while rotating the flywheel 80. The frame 7, in which the light source 6 is installed, is arranged above the rotary drive apparatus 1. The frame 7 is fixed to a case or the like in which the rotary drive apparatus 1 is arranged. The incoming light 60, which travels downward along a central axis 9 of a motor 10, is emitted from the light source 6. In the present preferred embodiment, the light source 6 and the frame 7 are arranged outside of the rotary drive apparatus 1. Note, however, that each of the light source 6 and the frame 7 may alternatively be included in the rotary drive apparatus 1.

Referring to FIG. 1, the rotary drive apparatus 1 includes the motor 10 and the flywheel 80.

1-2. Structure of Motor

Figure 2:
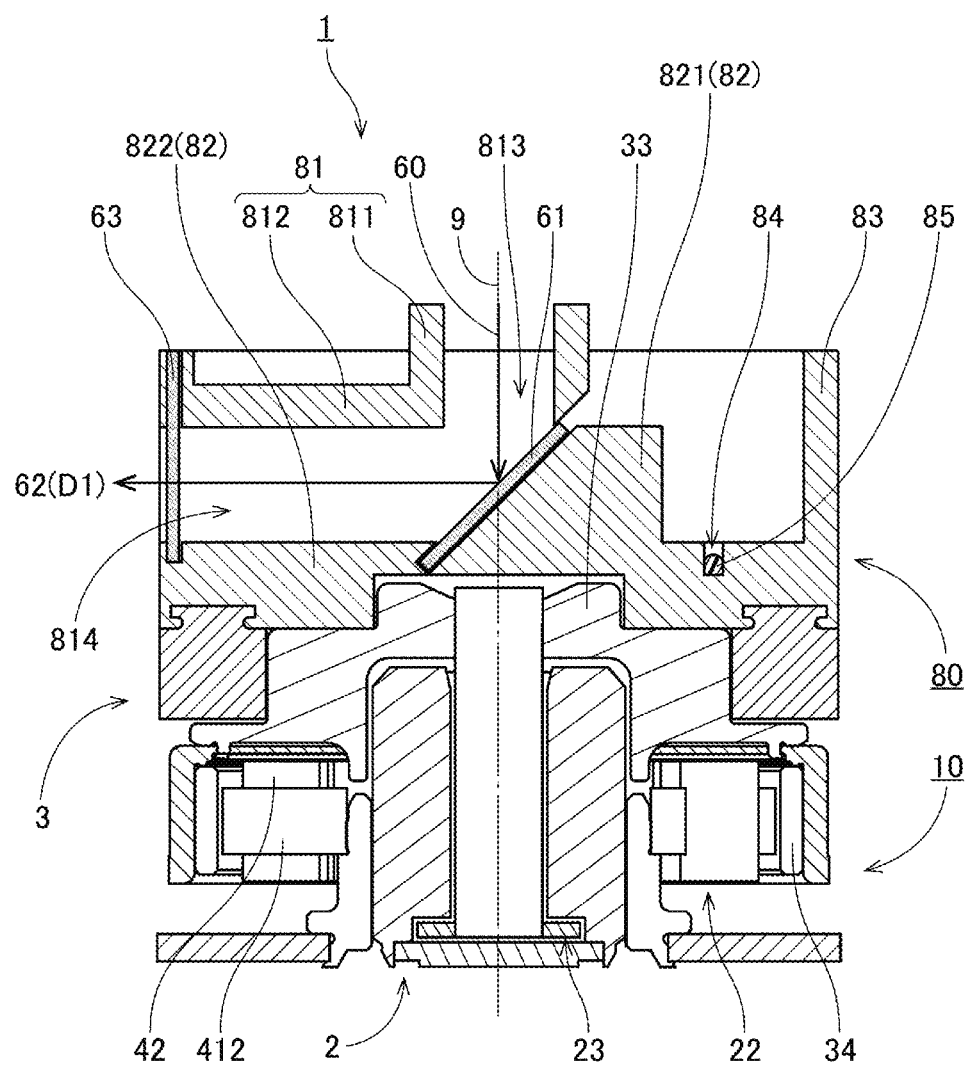
FIG. 2 is a vertical sectional view of the rotary drive apparatus according to the first preferred embodiment.

Next, the structure of the motor 10 will now be described below. FIG. 2 is a vertical sectional view of the rotary drive apparatus 1 according to the first preferred embodiment.

Referring to FIG. 2, the motor 10 includes a stationary portion 2 including a stator 22, and a rotating portion 3 including a rotor hub portion 33 and a magnet 34. The rotor hub portion 33 has at least a portion thereof arranged above the stator 22, and is arranged to extend in an annular shape around the central axis 9, which extends in the vertical direction. The stationary portion 2 is arranged to be stationary relative to the case or the like in which the rotary drive apparatus 1 is arranged. The rotating portion 3 is supported through a bearing portion 23 to be rotatable about the central axis 9 with respect to the stationary portion 2.

Once electric drive currents are supplied to coils 42 included in the stationary portion 2, magnetic flux is generated around each of a plurality of teeth 412, which are magnetic cores for the coils 42. Then, interaction between the magnetic flux of the teeth 412 and magnetic flux of the magnet 34 included in the rotating portion 3 produces a circumferential torque between the stationary portion 2 and the rotating portion 3, so that the rotating portion 3 is caused to rotate about the central axis 9 with respect to the stationary portion 2. Thus, the flywheel 80, which is rotatably held by the rotating portion 3, is caused to rotate about the central axis 9 together with the rotating portion 3.

As the bearing portion 23, a fluid dynamic bearing, in which a portion of the stationary portion 2 and a portion of the rotating portion 3 are arranged opposite to each other with a gap in which a lubricating oil exists therebetween and which is arranged to induce a fluid dynamic pressure in the lubricating oil, is used, for example. Note that a bearing of another type, such as, for example, a rolling-element bearing, may alternatively be used as the bearing portion 23.

1-3. Structure of Flywheel

Next, the structure of the flywheel 80 will now be described below. Hereinafter, reference will be made to FIGS. 1 and 2 appropriately as well as FIGS. 3 and 4.

Figure 3:
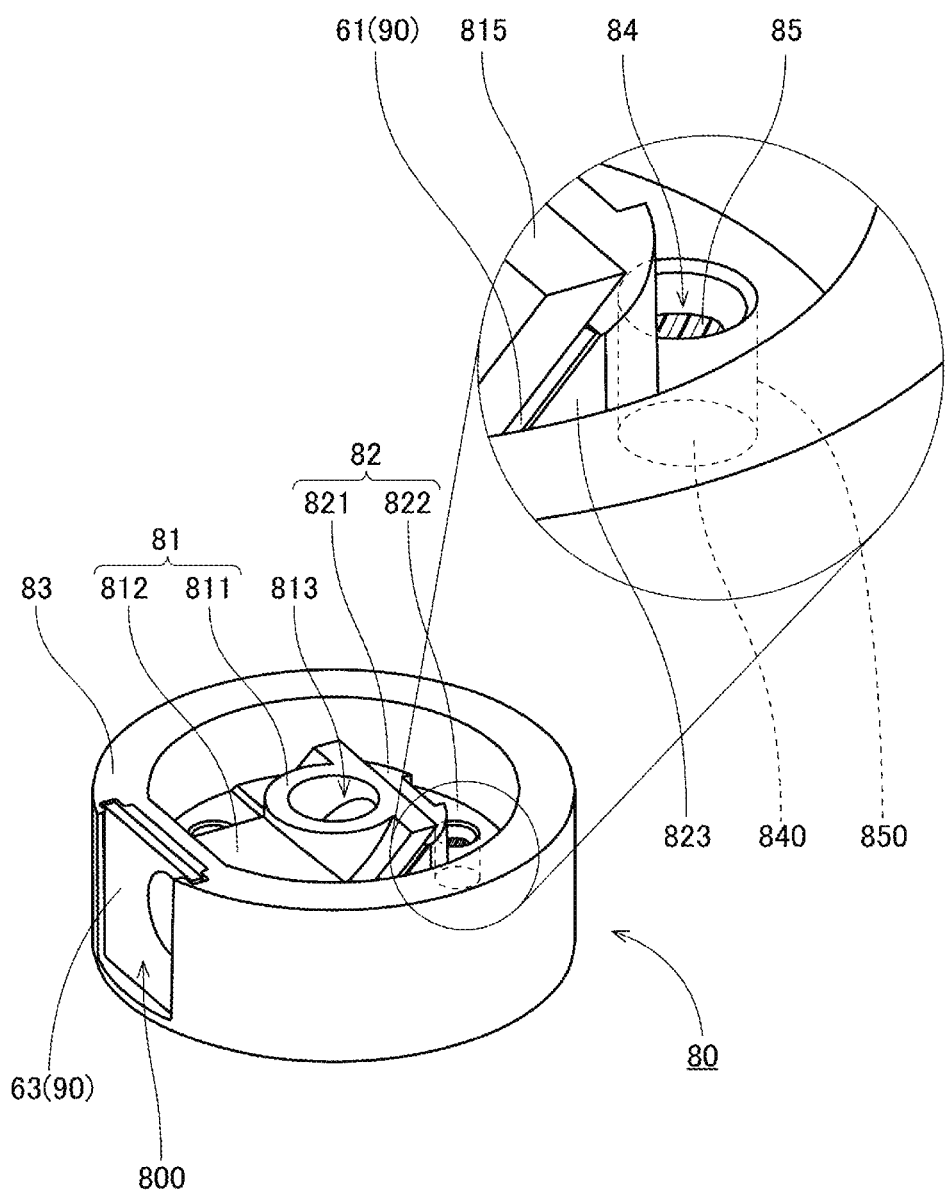
FIG. 3 is a perspective view of a flywheel according to the first preferred embodiment.

FIG. 3 is a perspective view of the flywheel 80 according to the first preferred embodiment. The flywheel 80 is supported by an upper end portion of the rotating portion 3 of the motor 10, and is arranged to rotate about the central axis 9 together with the rotating portion 3. The flywheel 80 is fixed to an upper surface of the rotating portion 3 through, for example, engagement, an adhesive, or the like. Referring to FIG. 3, the flywheel 80 includes optical components 90, an upper support portion 81, a lower support portion 82, an outer cylindrical portion 83, recessed portions 84, which will be described below, and weights 85, which will be described below. The optical components 90 include the mirror 61, which is arranged to reflect the incoming light 60 coming from the light source 6, and the lens 63, which is arranged to allow the reflected light 62 obtained by the mirror 61 reflecting the incoming light 60 to pass therethrough. A resin, for example, is used as a material of the flywheel 80. In particular, a main body (i.e., a part of the flywheel 80 which is made up of the upper support portion 81, the lower support portion 82, and the outer cylindrical portion 83) of the flywheel 80 is made of a highly heat-resistant resin, such as, for example, an LCP resin, a polycarbonate resin, or an ABS resin. In addition, the main body of the flywheel 80 is arranged to have a specific gravity in the range of, for example, about 1.2 to about 1.7.

Figure 4:
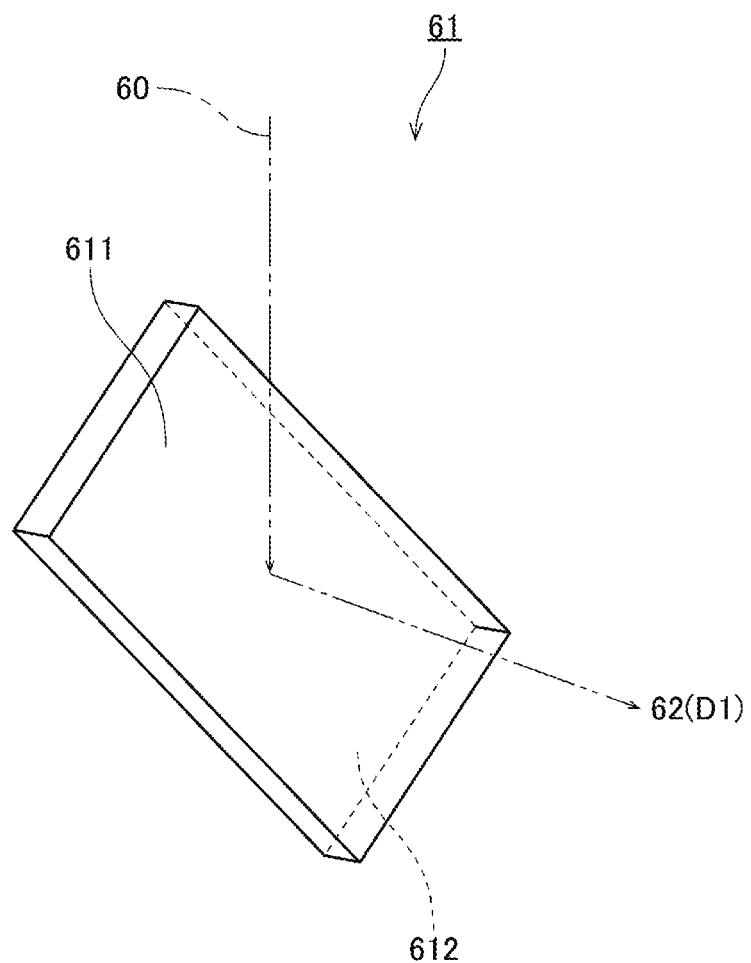
FIG. 4 is a perspective view of a mirror according to the first preferred embodiment.

FIG. 4 is a perspective view of the mirror 61 according to the first preferred embodiment. Referring to FIG. 4, the mirror 61 is in the shape of a flat rectangular parallelepiped. In other words, the mirror 61 is in the shape of a rectangular plate. In a situation in which the mirror 61 is fixed to the flywheel 80, the mirror 61 has at least a portion thereof arranged on the central axis 9, and is inclined at an angle of 45° with respect to the axial direction and the first radial direction D1. In addition, the mirror 61 is fitted and fixed in a gap axially between the upper support portion 81 and the lower support portion 82. The incoming light 60 impinges on a central portion of an upper surface 611, which is a reflecting surface, of the mirror 61. The central portion of the upper surface 611 refers to the entire upper surface 611, excluding a peripheral portion of the upper surface 611. A fully reflective mirror, for example, is used as the mirror 61.

The upper support portion 81 is a tubular portion including an upper vertical cylindrical portion 811 and a horizontal cylindrical portion 812. In the present preferred embodiment, the upper vertical cylindrical portion 811, the horizontal cylindrical portion 812, the lower support portion 82, and the outer cylindrical portion 83 are defined as a single monolithic member by a resin injection molding process. Note, however, that the upper vertical cylindrical portion 811, the horizontal cylindrical portion 812, the lower support portion 82, and the outer cylindrical portion 83 may alternatively be defined by separate members. The recessed portions 84, which will be described below, are defined in this resin injection molding process.

The upper vertical cylindrical portion 811 is a cylindrical portion arranged to extend in the axial direction from a radially inner end portion of the horizontal cylindrical portion 812. An inner circumferential surface of the upper vertical cylindrical portion 811 is arranged to extend in parallel with the central axis 9 of the motor 10. The upper vertical cylindrical portion 811 is arranged to define a light path along which the incoming light 60 travels in a cavity 813 radially inside thereof.

The horizontal cylindrical portion 812 is a cylindrical portion arranged to extend outward in a radial direction (i.e., in the first radial direction D1) from an outer circumferential portion of the upper vertical cylindrical portion 811. A cavity 814 inside of the horizontal cylindrical portion 812 is joined to the cavity 813 radially inside of the upper vertical cylindrical portion 811 at right angles. In addition, the cavity 814 inside of the horizontal cylindrical portion 812, the mirror 61, and the lens 63 are arranged to overlap at least in part with one another when viewed in the first radial direction D1. The horizontal cylindrical portion 812 is arranged to define a light path along which the reflected light 62 travels in the cavity 814 inside thereof.

Further, the upper support portion 81 includes an upper periphery support portion 815 arranged to extend outward from a lower end portion of the upper vertical cylindrical portion 811 and a radially inner end portion of the horizontal cylindrical portion 812. The upper periphery support portion 815 is arranged to be in contact with the peripheral portion of the upper surface 611 of the mirror 61 in the situation in which the mirror 61 is fixed to the flywheel 80. This contributes to more securely fixing the mirror 61.

The outer cylindrical portion 83 is a cylindrical member arranged to extend along the central axis 9 radially outside of the upper support portion 81. An outer circumferential surface of the outer cylindrical portion 83 defines a portion of an outer circumferential surface of the flywheel 80. In addition, a through hole 800, which is arranged to pass through the outer cylindrical portion 83 in the first radial direction D1, is defined in the outer cylindrical portion 83 at a circumferential position radially outside of the horizontal cylindrical portion 812. In addition, a radially outer end portion of the horizontal cylindrical portion 812 is joined to an inner circumferential surface of a portion of the outer cylindrical portion 83 which surrounds the through hole 800. The outer cylindrical portion 83 and the upper support portion 81 are thus joined to each other.

The lower support portion 82 includes a lower vertical cylindrical portion 821 and a joining portion 822. The lower vertical cylindrical portion 821 is a columnar portion arranged to extend in the axial direction, and having at least a portion thereof arranged below the upper support portion 81. Note that the lower vertical cylindrical portion 821 may alternatively be arranged to have a tubular structure and have a cavity (not shown) defined radially inside thereof. Further, a portion of the incoming light 60 may be allowed to pass through the mirror 61, and the lower vertical cylindrical portion 821 may be arranged to define a light path along which the portion of the incoming light 60 which has passed through the mirror 61 travels in the cavity (not shown) radially inside thereof.

In addition, the lower support portion 82 includes a lower periphery support portion 823 arranged to extend outward from an upper end portion of the lower vertical cylindrical portion 821. The lower periphery support portion 823 is arranged to be in contact with a peripheral portion of a lower surface 612 of the mirror 61 in the situation in which the mirror 61 is fixed to the flywheel 80. This contributes to more securely fixing the mirror 61.

The joining portion 822 is arranged to extend radially inward from an inner circumferential surface of the outer cylindrical portion 83, and is joined to an outer circumferential surface of the lower vertical cylindrical portion 821. Thus, the outer cylindrical portion 83 and the lower support portion 82 are joined to each other.

A portion of the outer cylindrical portion 83 and a portion of the joining portion 822 are recessed radially inward from outer circumferential surfaces thereof at one circumferential position. Each of these recessed portions is arranged to axially and radially overlap with a radially outer portion of the horizontal cylindrical portion 812 of the upper support portion 81 in the situation in which the mirror 61 is fixed to the flywheel 80. In the present preferred embodiment, the outer cylindrical portion 83 and the radially outer portion of the horizontal cylindrical portion 812 are joined to each other in the vicinity of these portions when the upper support portion 81, the lower support portion 82, and the outer cylindrical portion 83 are defined by the resin injection molding process.

Similarly to the mirror 61, the lens 63 is in the shape of a plate. The lens 63 is arranged at right angles to the first radial direction D1, that is, in parallel with the central axis 9, to cover the through hole 800 in a situation in which the lens 63 is fixed in the flywheel 80. The reflected light 62, which is obtained by the mirror 61 reflecting the incoming light 60 in the flywheel 80, passes through a central portion of the lens 63. The central portion of the lens 63 refers to the entire lens 63, excluding a peripheral portion of the lens 63.

The incoming light 60, which is emitted from the light source 6, enters the above-described flywheel 80 from above an upper surface of the flywheel 80, and travels downward along the central axis 9 in the cavity 813 radially inside of the upper vertical cylindrical portion 811. The incoming light 60 is then reflected by the mirror 61, and, further, travels outward in the first radial direction D1 in the cavity 814 inside of the horizontal cylindrical portion 812, and is emitted out of the rotary drive apparatus 1 through the lens 63.

The mirror 61 of the flywheel 80 is arranged to reflect the incoming light 60 from the light source 6 and emit the reflected light 62 to the outside while rotating about the central axis 9 together with the rotating portion 3 of the motor 10. Therefore, the first radial direction D1, which is a direction in which the reflected light 62 is emitted, also rotates together with the rotating portion 3. Thus, a wide range can be irradiated with light. Note that the outer circumferential surface of the flywheel 80 has a reflectivity lower than that of a surface of the mirror 61. This contributes to preventing diffuse reflection of the incoming light 60 from the light source 6.

Note that the rotary drive apparatus 1 may further include, in addition to the flywheel 80 arranged to emit the reflected light 62 to the outside in the first radial direction D1, another flywheel (not shown) which is arranged to emit reflected light to the outside in a second radial direction different from the first radial direction D1, and which is arranged, for example, below the motor 10. In this case, a half mirror the transmissivity and reflectivity of which are substantially equal is used as the mirror 61. Then, a half of the incoming light 60 which impinges on the mirror 61 in the flywheel 80 is reflected in the first radial direction D1 to be emitted to the outside. In addition, a remaining half of the incoming light 60 which impinges on the mirror 61 passes through the mirror 61, and travels downward in the cavity (not shown) radially inside of the lower vertical cylindrical portion 821. Further, a through hole (not shown) passing through the motor 10 in the axial direction is defined around the central axis 9 in the motor 10. Thus, the portion of the incoming light 60 which has passed through the mirror 61 passes through the through hole and reaches the other flywheel arranged below the motor 10. In this other flywheel, this portion of the incoming light 60 is reflected in the second radial direction to be emitted to the outside. Note that the rotary drive apparatus 1 may further include, in addition to the flywheel 80 arranged to emit the reflected light 62 to the outside in the first radial direction D1, another flywheel which is arranged to emit reflected light to the outside in a second radial direction different from the first radial direction D1, and which is arranged, for example, above the flywheel 80 as in a modification of the present preferred embodiment (see FIG. 8), which will be described below. Also note that two mirrors (not shown) which are arranged to reflect the incoming light 60 in mutually different directions may alternatively be installed in the single flywheel 80.

When light is emitted out in the two different directions, i.e., the first radial direction D1 and the second radial direction, as described above, light beams that are emitted out in the two different directions take different times to reach an object to be irradiated with light while the motor 10 is rotating, and this makes it possible to precisely recognize the three-dimensional position of the object in a space. Note that the other flywheel may alternatively be arranged in a rotary drive apparatus (not shown) other than the rotary drive apparatus 1 including the flywheel 80.

1-4. Structures of Recessed Portions and Weights

Next, the structures of the recessed portions 84 and the weights 85 will now be described below. Hereinafter, reference will be made to FIGS. 1 to 4 appropriately as well as FIG. 5.

Figure 5:
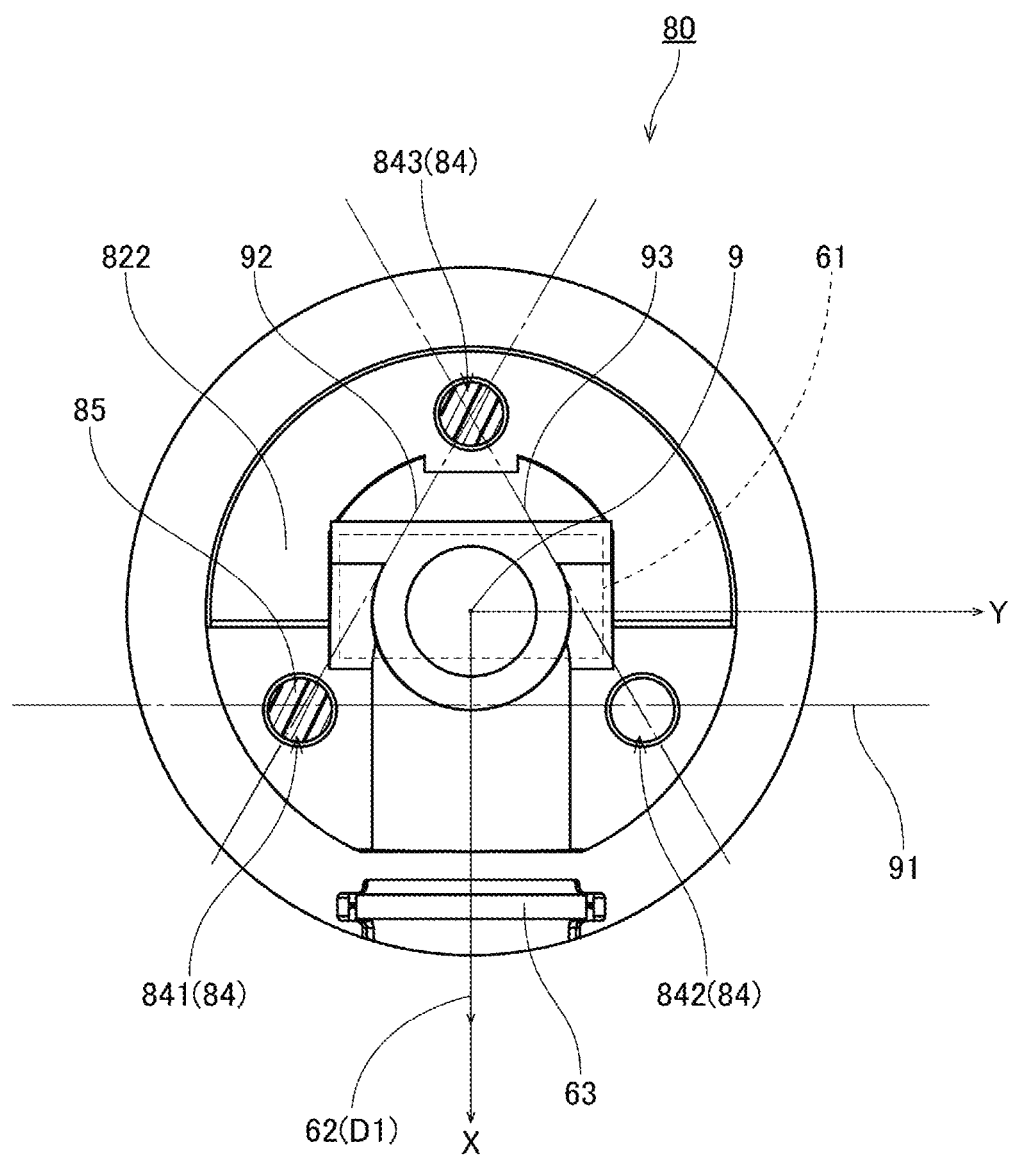
FIG. 5 is a top view of the flywheel according to the first preferred embodiment.

FIG. 5 is a top view of the flywheel 80 according to the first preferred embodiment. Referring to FIGS. 2, 3, and 5, the flywheel 80 includes at least one recessed portion 84 recessed axially downward from the upper surface thereof. The flywheel 80 further includes the weights 85, which are arranged in the recessed portions 84. Each weight 85 is made of, for example, a highly heat-resistant material, such as a UV-curing acrylic adhesive or the like. In addition, the weight 85 is arranged to have a specific gravity of, for example, 2.2 or more, which is greater than the specific gravity of the main body of the flywheel 80. This allows a center of gravity of a combination of the flywheel 80 and the rotating portion 3 of the motor 10, which together define a rotating part of the rotary drive apparatus 1, to be easily positioned on the central axis 9 in a situation in which the flywheel 80 is installed on the upper end portion of the rotating portion 3 of the motor 10. As a result, balance of the rotating part during rotation can be corrected. In addition, provision of the recessed portions 84 makes it easier to position the weights 85, and, further, contributes to preventing a movement and a displacement of each weight 85. Note that each weight 85 may be made of a UV-curing adhesive, or may alternatively be defined by a metal body made of, for example, iron, lead, or tungsten. Also note that each weight 85 may alternatively be defined by an adhesive clayey body. Further, each weight 85 may be arranged to have a shape substantially the same as that of each recessed portion 84. Note that each weight 85 may alternatively be arranged to have a specific gravity of less than 2.2. Also note that each weight 85 may be arranged to have a specific gravity greater than a specific gravity of the whole flywheel 80, including the optical components 90.

In the present preferred embodiment, a bottom surface 840 of each recessed portion 84 is arranged at a level higher than that of an upper end portion of the rotor hub portion 33 of the motor 10 and lower than that of a lower end portion of the horizontal cylindrical portion 812 of the flywheel 80. When the depth of the recessed portion 84 is arranged to be large as described above, the weight 85 can be arranged at a lower position. This contributes to further stabilizing the balance of the rotating part of the rotary drive apparatus 1 during the rotation. Note that the bottom surface 840 of each recessed portion 84 may alternatively be arranged at a level higher than that of the lower end portion of the horizontal cylindrical portion 812. When the depth of the recessed portion 84 is arranged to be small as described above, the arrangement of the weight 85 in the recessed portion 84 is made easier. Moreover, the recessed portion 84 can be easily defined in a process of manufacturing the flywheel 80.

In addition, referring to FIG. 5, in a plan view of the flywheel 80, each recessed portion 84 is arranged at a position different from that of the light path along which the reflected light 62 travels in the flywheel 80. This prevents the travel of the reflected light 62 from being blocked by any recessed portion 84 or the weight 85 arranged in any recessed portion 84. In the present preferred embodiment, each recessed portion 84 is recessed axially downward from an upper surface of the joining portion 822. Note, however, that each recessed portion 84 may alternatively be recessed axially downward from an upper surface of the outer cylindrical portion 83, for example.

As described above, in manufacture of the rotary drive apparatus 1, the flywheel 80, which supports the mirror 61 and the lens 63, which are the optical components 90, is attached to an upper portion of the motor 10, and thereafter, the weights 85 are inserted and arranged in the recessed portions 84 defined in the flywheel 80 in view of the balance of the flywheel 80 and the rotating portion 3 of the motor 10, which together define the rotating part of the rotary drive apparatus 1, during the rotation. This allows the balance to be corrected without the need to remove the flywheel 80 once attached. After being arranged in a corresponding one of the recessed portions 84, each weight 85 is fixed to at least a portion of the recessed portion 84 through adhesion. The weight 85 can thus be securely fixed in the recessed portion 84, and can be restrained from moving or being displaced.

In the present preferred embodiment, when each weight 85 is arranged in the corresponding recessed portion 84, the weight 85 falls down to a bottom portion of the recessed portion 84 by gravity to come into contact with the bottom surface 840 of the recessed portion 84. Then, the weight 85 is fixed to the bottom surface 840. Note, however, that the weight 85 may alternatively be fixed to a side surface 850 of the recessed portion 84 through adhesion at an axial middle of the recessed portion 84. Also note that, before the weight 85 is arranged in the recessed portion 84, another member (not shown) having a specific gravity smaller than that of the weight 85 may be first arranged in the recessed portion 84. The axial position of the weight 85 in the recessed portion 84 can be easily changed by arranging the other member (not shown) in the recessed portion 84 and then arranging the weight 85 thereon. This allows the balance of the rotating part of the rotary drive apparatus 1 during the rotation to be corrected at a desired axial position.

Next, the number of recessed portions 84 and a relationship between the recessed portions 84 will now be described below. Referring to FIG. 5, in the present preferred embodiment, a plurality of recessed portions 84 are provided. In addition, the recessed portions 84 are arranged at regular intervals in a circumferential direction. This makes it easy to set an appropriate mass of each of the weights 85 arranged in the recessed portions 84 in accordance with a required amount of balance correction. In addition, irregular rotation of the flywheel 80 caused by the recessed portions 84 can be reduced when compared to the case where the recessed portions 84 are arranged at irregular intervals in the circumferential direction.

In the present preferred embodiment, the weights 85 are arranged in at least two of the recessed portions 84. The weight 85 arranged in each of the at least two of the recessed portions 84 may be arranged to have a different mass. This allows the center of gravity of the combination of the flywheel 80 and the rotating portion 3 of the motor 10, which together define the rotating part of the rotary drive apparatus 1, to be easily positioned on the central axis 9. As a result, the balance of the rotating part during the rotation can be corrected. Note that the weight 85 arranged in each of the at least two of the recessed portions 84 may alternatively be arranged to have an equal mass. In the case where the weights 85 are arranged to have the same mass, the weights 85 can be arranged efficiently with the recessed portions 84 by preparing a plurality of weights 85 having the same mass in advance.

In addition, in the present preferred embodiment, the bottom surface 840 of each of the recessed portions 84 is arranged at the same axial position. When each of the recessed portions 84 is arranged to have the same depth, the weights 85 can be arranged efficiently with the recessed portions 84. Note, however, that the bottom surface 840 of each of the recessed portions 84 may alternatively be arranged at a different axial position. In this case, it is possible to define the recessed portions 84 while securing sufficient flexibility in designing the shape of the flywheel 80. In addition, it is possible to arrange the weights 85 at different axial positions in the recessed portions 84. This makes it possible to correct the axial mass distribution of the flywheel 80 and the rotating portion 3 of the motor 10, which together define the rotating part of the rotary drive apparatus 1, as well. Thus, the balance of the rotating part of the rotary drive apparatus 1 during the rotation can be more properly corrected.

Also note that, in the case where the bottom surface 840 of each of the recessed portions 84 is arranged at the same axial position, the weights 85 may be fixed at different axial positions through adhesion in at least two of the recessed portions 84. This allows the weights 85 to be arranged at different axial positions in the at least two of the recessed portions 84. This makes it possible to correct the axial mass distribution of the flywheel 80 and the rotating portion 3 of the motor 10, which together define the rotating part of the rotary drive apparatus 1, as well. Thus, the balance of the rotating part of the rotary drive apparatus 1 during the rotation can be more properly corrected.

Further, a positional relationship between the recessed portions 84 will now be described below. Referring to FIG. 5, in the present preferred embodiment, at least three recessed portions 84, including a first recessed portion 841, a second recessed portion 842, and a third recessed portion 843, are provided. In FIG. 5, the weights 85 are arranged in the first recessed portion 841 and the third recessed portion 843 by way of example. Note, however, that the number of recessed portions 84, the number of recessed portions 84 in which the weights 85 are arranged, and the positions of the recessed portions 84 in which the weights 85 are arranged are not limited to those of the example of FIG. 5. For example, no weights 85 may be arranged in two or more of the recessed portions 84.

Here, a horizontal plane perpendicular to the central axis 9 is defined as an xy-plane. In addition, a direction in which the reflected light 62 travels in the flywheel 80 is defined as an x direction, and a direction perpendicular to the direction in which the reflected light 62 travels is defined as a y direction. Further, a point of intersection of the mirror 61, which is one of the optical components 90, with the central axis 9 is defined as a center of the xy-plane. Referring to FIG. 5, in the present preferred embodiment, in the plan view of the flywheel 80, a first straight line 91, which joins the first recessed portion 841 and the second recessed portion 842, crosses the light path along which the reflected light 62 travels in the flywheel 80. That is, the first recessed portion 841 and the second recessed portion 842 are arranged opposite to each other with an x-axis therebetween. In other words, the first recessed portion 841 and the second recessed portion 842 are arranged at negative and positive positions, respectively, in the y direction with reference to the x-axis.

In addition, in the present preferred embodiment, in the plan view of the flywheel 80, each of a second straight line 92, which joins the first recessed portion 841 and the third recessed portion 843, and a third straight line 93, which joins the second recessed portion 842 and the third recessed portion 843, does not cross the light path along which the reflected light 62 travels. That is, with reference to the point of intersection of the mirror 61 with the central axis 9 (i.e., the center of the xy-plane), each of the first recessed portion 841 and the second recessed portion 842 is arranged at a positive position in the x direction, and the third recessed portion 843 is arranged at a negative position in the x direction.

As described above, in the present preferred embodiment, with reference to the point of intersection of the mirror 61 with the central axis 9 (i.e., the center of the xy-plane), at least one of the recessed portions 84 is arranged at a positive position in the x direction, and at least one of the recessed portions 84 is arranged at a negative position in the x direction. In addition, with reference to the point of intersection of the mirror 61 with the central axis 9 (i.e., the center of the xy-plane), at least one of the recessed portions 84 is arranged at a positive position in the y direction, and at least one of the recessed portions 84 is arranged at a negative position in the y direction. Thus, even in the case where the center of gravity of the combination of the flywheel 80 and the rotating portion 3 of the motor 10, which together define the rotating part of the rotary drive apparatus 1, is displaced from the central axis 9 in the x direction or in the y direction, the center of gravity can be adjusted onto the central axis 9 by arranging the weight(s) 85 in one or more of the aforementioned recessed portions 84. As a result, the balance of the rotating part of the rotary drive apparatus 1 during the rotation can be securely corrected.

2. Example Modifications

While preferred embodiments of the present invention have been described above, it is to be understood that the present invention is not limited to the above-described preferred embodiments.

Figure 6:
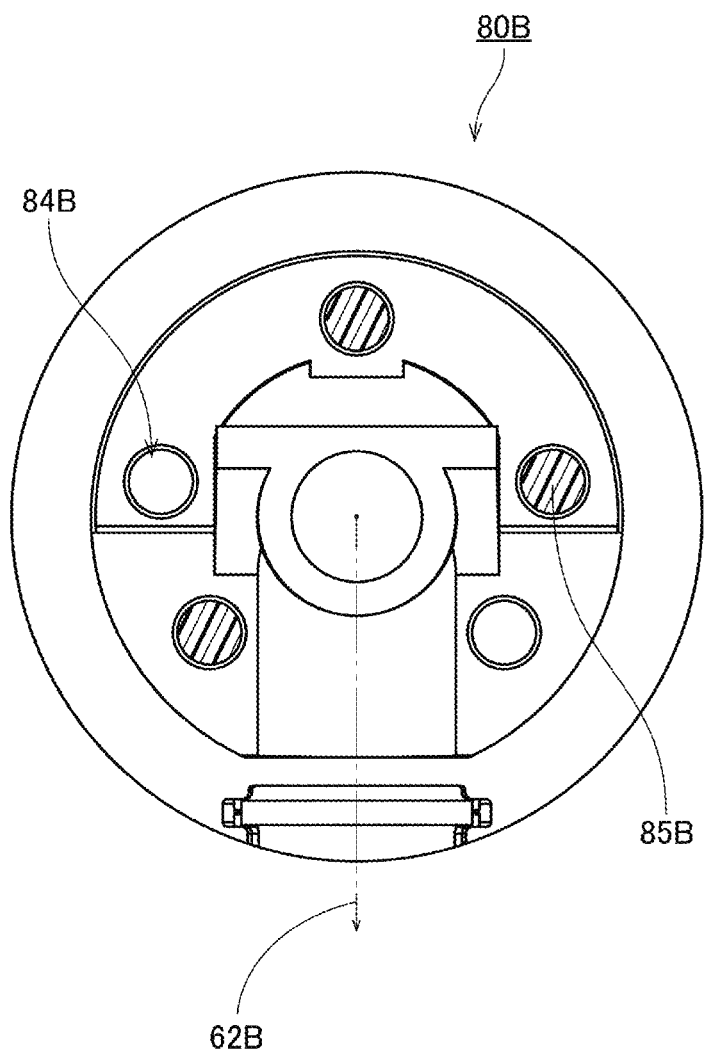
FIG. 6 is a top view of a flywheel according to a modification of the first preferred embodiment.

FIG. 6 is a top view of a flywheel 80B according to a modification of the first preferred embodiment. In the modification illustrated in FIG. 6, a plurality of recessed portions 84B are arranged at irregular intervals in the circumferential direction. This makes it possible to arrange the recessed portions 84B at positions away from a light guide portion in manufacture of the flywheel 80B, even in the case where a large number of recessed portions 84B are provided as in the present modification. This contributes to easily preventing travel of reflected light 62B from being blocked by any recessed portion 84B or a weight 85B arranged in any recessed portion 84B.

Figure 7:
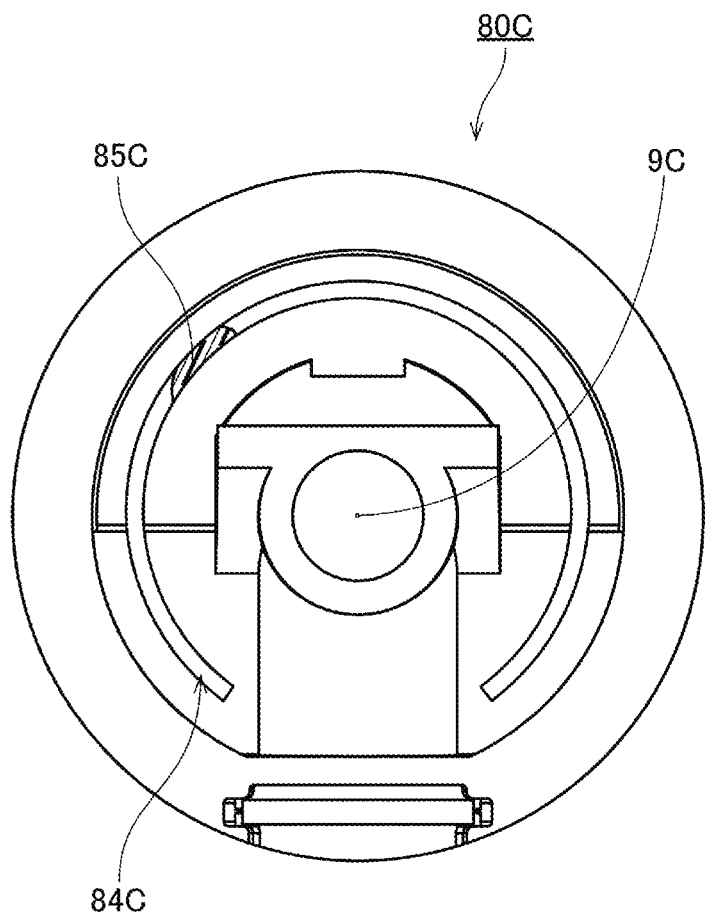
FIG. 7 is a top view of a flywheel according to a modification of the first preferred embodiment.

FIG. 7 is a top view of a flywheel 80C according to another modification of the first preferred embodiment. In the modification illustrated in FIG. 7, a recessed portion 84C is recessed in the shape of a circular arc, extending in the circumferential direction, with a central axis 9C as a center. In addition, a weight 85C is arranged in at least a portion of the recessed portion 84C at one circumferential position. This allows a center of gravity of a combination of the flywheel 80C and a rotating portion (not shown) of a motor, which together define a rotating part, to be adjusted onto the central axis 9C, and allows balance of the rotating part during rotation to be corrected. In addition, the weight 85C can be arranged at any desirable position in the recessed portion 84C in the shape of a circular arc. Accordingly, the position of the center of gravity of the combination of the flywheel 80C and the rotating portion of the motor can be corrected in a more sophisticated manner. Note that the recessed portion 84C may alternatively be recessed in the shape of a circular ring, extending all the way around in the circumferential direction, with the central axis 9C as a center. Also note that a plurality of recessed portions 84C each of which is in the shape of a circular arc and which are spaced from each other in the circumferential direction may alternatively be provided.

Figure 8:
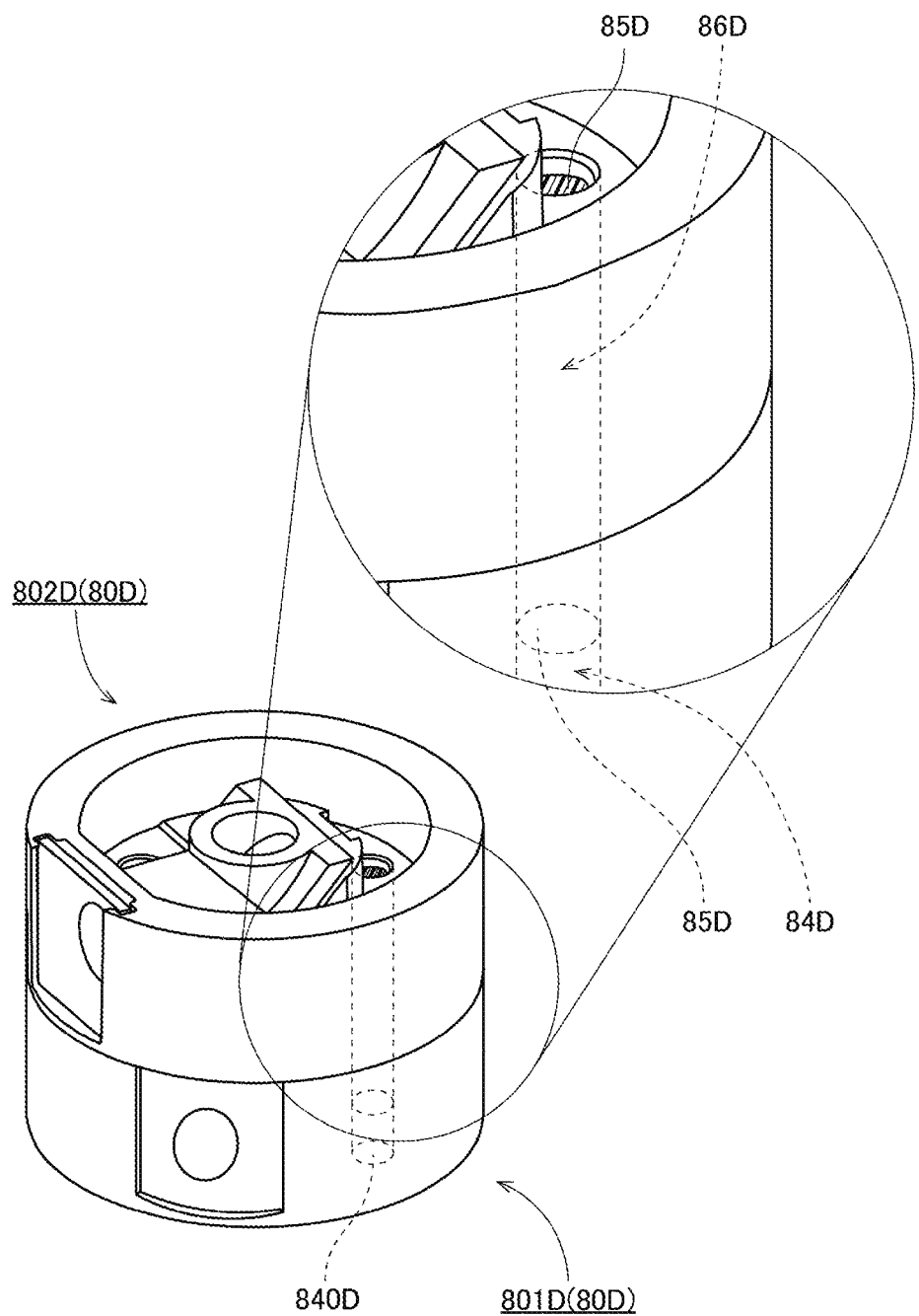
FIG. 8 is a perspective view of flywheels according to a modification of the first preferred embodiment.

FIG. 8 is a perspective view of flywheels 80D according to yet another modification of the first preferred embodiment. In the modification illustrated in FIG. 8, the flywheels 80D include a first flywheel 801D and a second flywheel 802D. The first flywheel 801D is arranged to have a structure equivalent to that of the flywheel 80 according to the first preferred embodiment. The second flywheel 802D is arranged to have a structure equivalent to that of the flywheel 80 according to the first preferred embodiment except in a recessed portion 84D and a through hole 86D, which will be described below. In addition, the second flywheel 802D is arranged axially above the first flywheel 801D, and is fixed to an upper surface of the first flywheel 801D through, for example, engagement, an adhesive, or the like. The second flywheel 802D is indirectly supported by a motor (not shown), and is arranged to rotate about a central axis (not shown) together with a rotating portion (not shown) of the motor and the first flywheel 801D. A half mirror the transmissivity and reflectivity of which are substantially equal, for example, is installed in the second flywheel 802D. A half of incoming light which enters the second flywheel 802D from above an upper surface of the second flywheel 802D is reflected in a second radial direction by the half mirror in the second flywheel 802D to be emitted to an outside. In addition, a remaining half of the incoming light passes through the half mirror, travels further downward, and is reflected in the first radial direction by a mirror (not shown) installed in the first flywheel 801D to be emitted to the outside.

Referring to FIG. 8, the second flywheel 802D includes the through hole 86D, which is arranged to pass through the second flywheel 802D in the axial direction. In addition, the through hole 86D and a recessed portion 84D of the first flywheel 801D are arranged to axially overlap with each other in a situation in which the second flywheel 802D is fixed to the first flywheel 801D axially above the first flywheel 801D. Note that the number of through holes 86D provided in the second flywheel 802D is equal to the number of recessed portions 84D of the first flywheel 801D, and each of the through holes 86D is arranged to axially overlap with a separate one of the recessed portions 84D. When a rotary drive apparatus 1 is manufactured, the flywheels 80D are attached to the motor, and thereafter, a weight(s) 85D is inserted into one or more of the through holes 86D in view of balance of the flywheels 80D and the rotating portion (not shown) of the motor, which together define a rotating part, during rotation. The weight 85D inserted passes through the through hole 86D and falls down to a bottom portion of the corresponding recessed portion 84D of the first flywheel 801D by gravity, and piles up on a bottom surface 840D of the recessed portion 84D. Thus, the weight 85D can be arranged at a lower position, which lowers a center of gravity of a rotating part including the weight 85D, resulting in more stable balance during the rotation.

Further, in the above-described preferred embodiment, each weight is fixed to at least a portion of the corresponding recessed portion through adhesion after being arranged in the recessed portion. Note, however, that clayey lead or a material having an adhesive property, for example, may be used as the weight, and in this case, the weight can be fixed in the corresponding recessed portion without use of a separate adhesive.

Also note that the detailed shape of any member may be different from the shape thereof as illustrated in the accompanying drawings of the present application. Also note that features of the above-described preferred embodiments and the modifications thereof may be combined appropriately as long as no conflict arises.

Preferred embodiments of the present invention are applicable to, for example, rotary drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotary drive apparatus arranged to rotate a flywheel arranged to support an optical component arranged to reflect incoming light coming from a light source or allow reflected light obtained by reflection of the incoming light to pass therethrough, the rotary drive apparatus comprising:
   a motor including a rotating portion; and
   the flywheel, the flywheel being supported by the motor and arranged to rotate about a central axis extending in a vertical direction; wherein the flywheel includes:
   at least one recessed portion recessed axially downward from an upper surface of the flywheel; and
   at least one weight arranged in the at least one recessed portion; wherein
   the flywheel further includes a tubular horizontal cylindrical portion arranged to extend in a radial direction and define a light path along which the reflected light travels inside thereof; and
   a bottom surface of the at least one recessed portion is arranged at a level higher than that of a lower end portion of the horizontal cylindrical portion.

2. The rotary drive apparatus according to claim 1, wherein
   the flywheel includes a plurality of the recessed portions; and
   the plurality of recessed portions are arranged at regular intervals in a circumferential direction.

3. The rotary drive apparatus according to claim 2, wherein
   the at least one weight is arranged in at least two of the recessed portions; and
   the weight arranged in each of the at least two recessed portions is arranged to have a different mass.

4. The rotary drive apparatus according to claim 2, wherein
   the at least one weight is arranged in at least two of the recessed portions; and
   the weight arranged in each of the at least two recessed portions is arranged to have an equal mass.

5. The rotary drive apparatus according to claim 2, wherein a bottom surface of each of the plurality of recessed portions is arranged at a same axial position.

6. The rotary drive apparatus according to claim 5, wherein the at least one weight is fixed at different axial positions through adhesion in at least two of the recessed portions.

7. The rotary drive apparatus according to claim 2, wherein a bottom surface of each of the plurality of recessed portions is arranged at a different axial position.

8. The rotary drive apparatus according to claim 1, wherein
   the flywheel includes a plurality of the recessed portions; and
   the plurality of recessed portions are arranged at irregular intervals in a circumferential direction.

9. The rotary drive apparatus according to claim 1, wherein, in a plan view, the at least one recessed portion is arranged at a position different from that of a light path along which the reflected light travels in the flywheel.

10. The rotary drive apparatus according to claim 1, wherein the at least one weight is fixed to at least a portion of a corresponding one of the at least one recessed portion through adhesion.

11. The rotary drive apparatus according to claim 1, wherein
the flywheel further includes another member having a specific gravity smaller than that of the at least one weight in the at least one recessed portion; and
the at least one weight is arranged on the another member in the at least one recessed portion.

12. The rotary drive apparatus according to claim 1, wherein the at least one recessed portion is recessed in a shape of a circular ring or a circular arc, extending in a circumferential direction, with the central axis as a center.

13. The rotary drive apparatus according to claim 1, wherein the at least one weight is arranged to have a specific gravity greater than a specific gravity of the flywheel.

14. A rotary drive apparatus arranged to rotate a flywheel arranged to support an optical component arranged to reflect incoming light coming from a light source or allow reflected light obtained by reflection of the incoming light to pass therethrough, the rotary drive apparatus comprising:
a motor including a rotating portion; and
the flywheel, the flywheel being supported by the motor and arranged to rotate about a central axis extending in a vertical direction; wherein
the flywheel includes:
at least one recessed portion recessed axially downward from an upper surface of the flywheel; and
at least one weight arranged in the at least one recessed portion; wherein
the optical component is a mirror arranged to reflect the incoming light;
the at least three recessed portion includes a first recessed portion, a second recessed portion, and a third recessed portion;
in a plan view, a first straight line joining the first recessed portion and the second recessed portion is arranged to cross a light path along which the reflected light travels in the flywheel; and
in the plan view, each of a second straight line joining the first recessed portion and the third recessed portion and a third straight line joining the second recessed portion and the third recessed portion is arranged not to cross the light path.

15. A rotary drive apparatus arranged to rotate a flywheel arranged to support an optical component arranged to reflect incoming light coming from a light source or allow reflected light obtained by reflection of the incoming light to pass therethrough, the rotary drive apparatus comprising:
a motor including a rotating portion; and
the flywheel, the flywheel being supported by the motor and arranged to rotate about a central axis extending in a vertical direction; wherein
the flywheel includes:
at least one recessed portion recessed axially downward from an upper surface of the flywheel; and
at least one weight arranged in the at least one recessed portion; wherein
the rotating portion includes a rotor hub portion having at least a portion thereof arranged above a stator of the motor, and arranged to extend in an annular shape around the central axis;
the flywheel further includes a tubular horizontal cylindrical portion arranged to extend in a radial direction and define a light path along which the reflected light travels inside thereof; and
a bottom surface of the at least one recessed portion is arranged at a level higher than that of an upper end portion of the rotor hub portion and lower than that of a lower end portion of the horizontal cylindrical portion.

16. A rotary drive apparatus arranged to rotate a first flywheel arranged to support an optical component arranged to reflect incoming light coming from a light source or allow reflected light obtained by reflection of the incoming light to pass therethrough, the rotary drive apparatus comprising:
a motor including a rotating portion; and
the first flywheel, the first flywheel being supported by the motor and arranged to rotate about a central axis extending in a vertical direction; wherein
the first flywheel includes:
at least one recessed portion recessed axially downward from an upper surface of the first flywheel;
at least one weight arranged in the at least one recessed portion; and
a second flywheel arranged axially above the first flywheel, indirectly supported by the motor, and arranged to rotate about the central axis; wherein
the second flywheel includes a through hole arranged to pass through the second flywheel in an axial direction; and
the through hole and a corresponding one of the at least one recessed portion are arranged to axially overlap with each other.

* * * * *